United States Patent
Nakagome et al.

(10) Patent No.: US 9,002,071 B2
(45) Date of Patent: Apr. 7, 2015

(54) IMAGE SEARCH SYSTEM, IMAGE SEARCH APPARATUS, IMAGE SEARCH METHOD AND COMPUTER-READABLE STORAGE MEDIUM

(71) Applicant: Casio Computer Co., Ltd., Shibuya-ku, Tokyo (JP)

(72) Inventors: Kouichi Nakagome, Tokorozawa (JP); Masayuki Hirohama, Fussa (JP); Kazuhisa Matsunaga, Fussa (JP); Michihiro Nihei, Mitaka (JP)

(73) Assignee: Casio Computer Co., Ltd., Tokyo (JP)

( * ) Notice: Subject to any disclaimer, the term of this patent is extended or adjusted under 35 U.S.C. 154(b) by 156 days.

(21) Appl. No.: 13/831,293

(22) Filed: Mar. 14, 2013

(65) Prior Publication Data

US 2013/0251266 A1 Sep. 26, 2013

(30) Foreign Application Priority Data

Mar. 21, 2012 (JP) .................. 2012-063791

(51) Int. Cl.
*G06K 9/00* (2006.01)
*G06T 1/60* (2006.01)
*G06F 17/30* (2006.01)

(52) U.S. Cl.
CPC .............. *G06T 1/60* (2013.01); *G06K 9/00657* (2013.01); *G06F 17/30247* (2013.01)

(58) Field of Classification Search
CPC ................................. G06K 9/00657
USPC .................. 382/110, 216, 218, 224
See application file for complete search history.

(56) References Cited

U.S. PATENT DOCUMENTS 7,877,414 B2 * 1/2011 Bober ........................... 707/791
8,189,880 B2 * 5/2012 Wen et al. .................... 382/118

(Continued)

FOREIGN PATENT DOCUMENTS

JP 2002-203242 A 7/2002
JP 2005-117182 A 4/2005

(Continued)

OTHER PUBLICATIONS

Japanese Office Action dated Apr. 25, 2014 (and English translation thereof) in counterpart Japanese Application No. 2012-063791.

*Primary Examiner* — Aaron W Carter
(74) *Attorney, Agent, or Firm* — Holtz, Holtz, Goodman & Chick PC

(57) ABSTRACT

In the present invention, a database has feature information stored in association with flower sample images flower names, leaf sample images, and images indicating attention points for narrowing down the flower names. An extracting section extracts flower sample images having a high similarity to the image of the imaged flower as candidate images by comparing feature information of the image of the imaged flower and feature information stored in the database. A control section causes the image of the imaged flower, the extracted candidate images, flower names corresponding to the candidate images, and attention points for narrowing down the candidate images to be arranged and displayed on a display section, and changes the candidate images to their respective leaf sample images for display. The control section also changes the candidate images to images indicating their respective attention points and causes them to be displayed on the display section.

21 Claims, 12 Drawing Sheets

(56) References Cited

U.S. PATENT DOCUMENTS

| | | | |
|---|---|---|---|
| 8,203,732 B2* | 6/2012 | Shiiyama | 358/1.15 |
| 8,301,389 B2* | 10/2012 | Dunlap | 702/19 |
| 8,352,465 B1* | 1/2013 | Jing et al. | 707/723 |
| 8,577,616 B2* | 11/2013 | Dunlap | 702/19 |
| 8,600,971 B2* | 12/2013 | Kira et al. | 707/706 |
| 8,612,429 B2 | 12/2013 | Itoh | |
| 8,781,178 B2* | 7/2014 | Nagaoka et al. | 382/118 |
| 2004/0024758 A1* | 2/2004 | Iwasaki | 707/3 |
| 2004/0215660 A1* | 10/2004 | Ikeda | 707/104.1 |
| 2005/0076004 A1* | 4/2005 | Yanagisawa et al. | 707/1 |
| 2005/0192760 A1* | 9/2005 | Dunlap | 702/19 |
| 2006/0224327 A1* | 10/2006 | Dunlap | 702/19 |
| 2008/0030792 A1* | 2/2008 | Shiiyama | 358/402 |
| 2008/0065614 A1* | 3/2008 | Bober | 707/3 |
| 2008/0298766 A1* | 12/2008 | Wen et al. | 386/46 |
| 2010/0277620 A1* | 11/2010 | Iijima et al. | 348/240.1 |
| 2010/0303342 A1* | 12/2010 | Berg et al. | 382/155 |
| 2011/0052069 A1* | 3/2011 | Nakabayashi et al. | 382/190 |
| 2012/0257021 A1* | 10/2012 | Kira et al. | 348/47 |
| 2013/0050192 A1* | 2/2013 | Kira et al. | 345/419 |

FOREIGN PATENT DOCUMENTS

| | | |
|---|---|---|
| JP | 2007-133816 A | 5/2007 |
| JP | 2007-200020 A | 8/2007 |
| JP | 2009-169856 A | 7/2009 |
| JP | 2011-035636 A | 2/2011 |

* cited by examiner

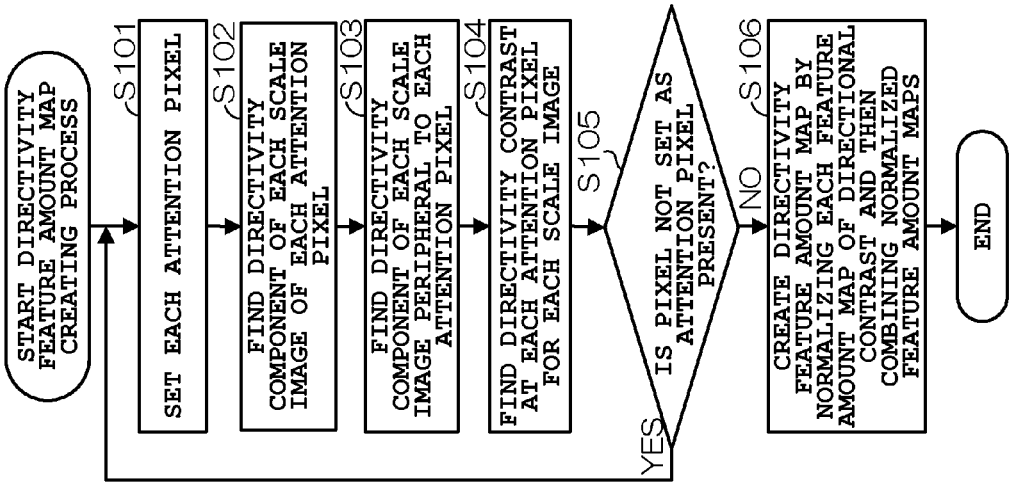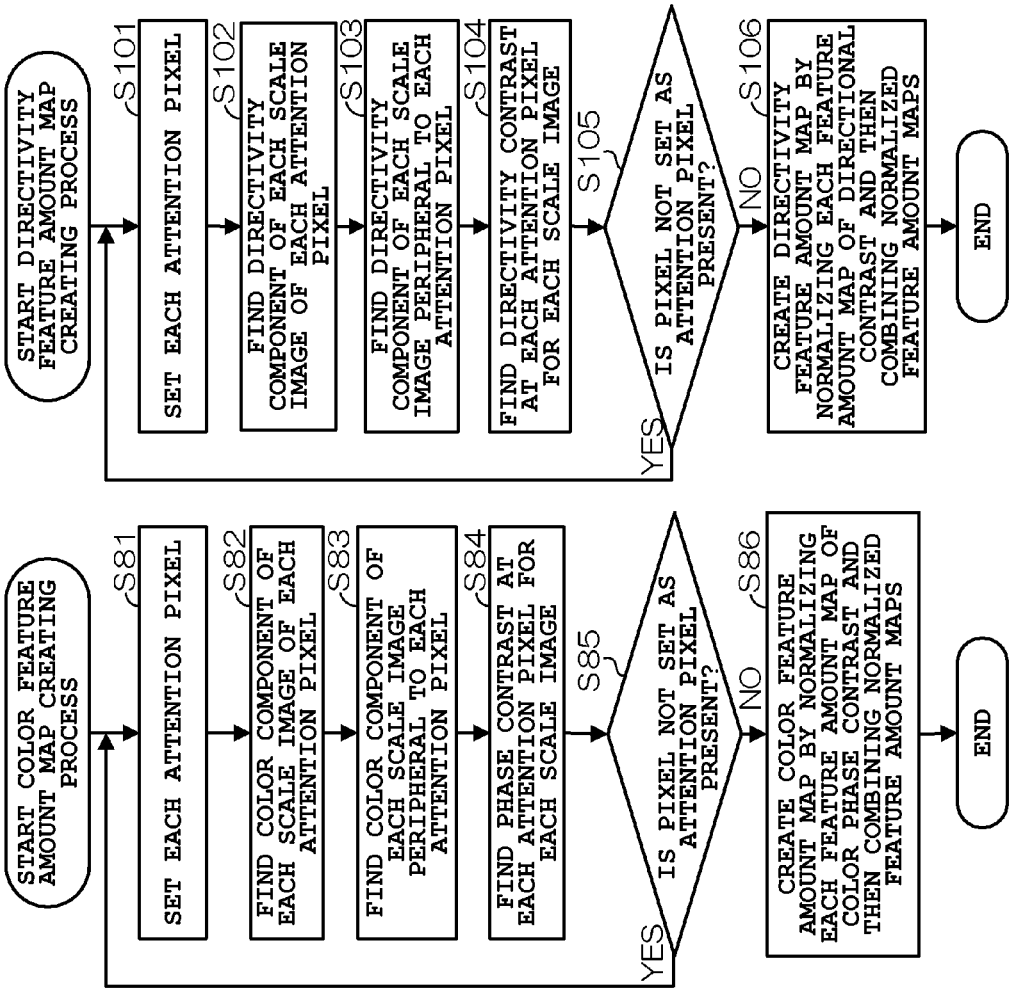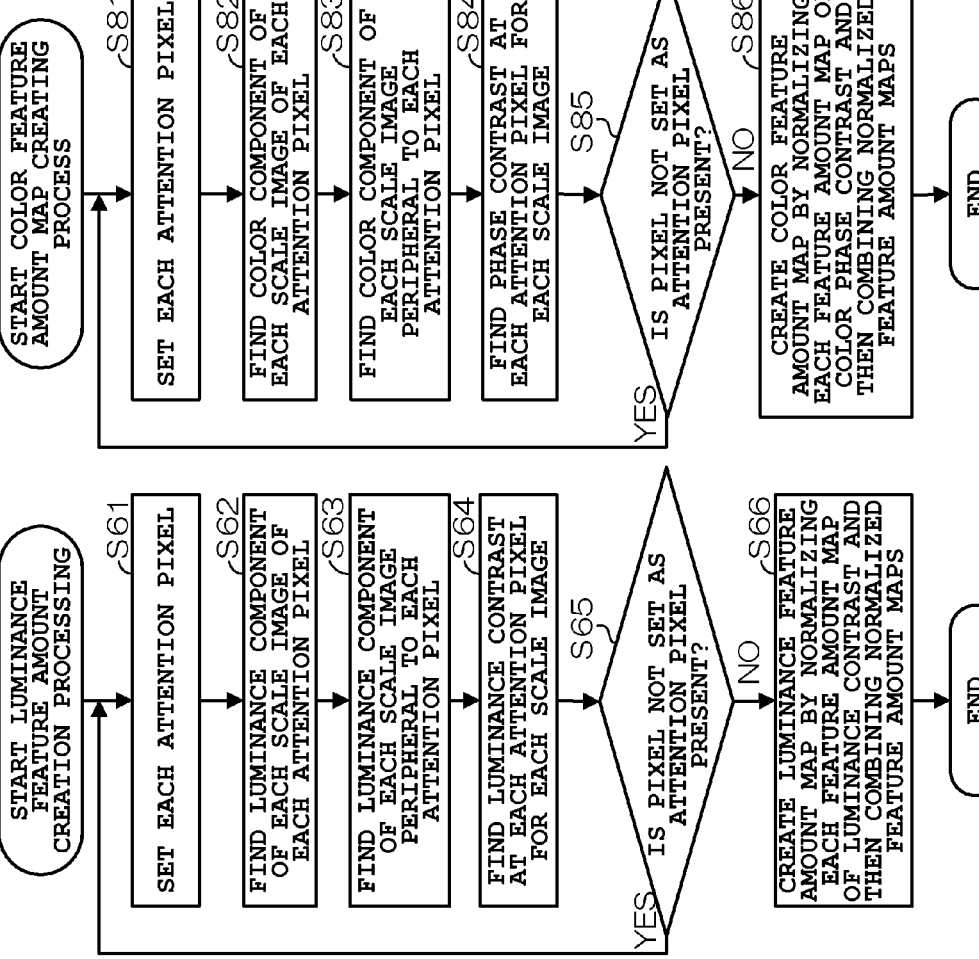

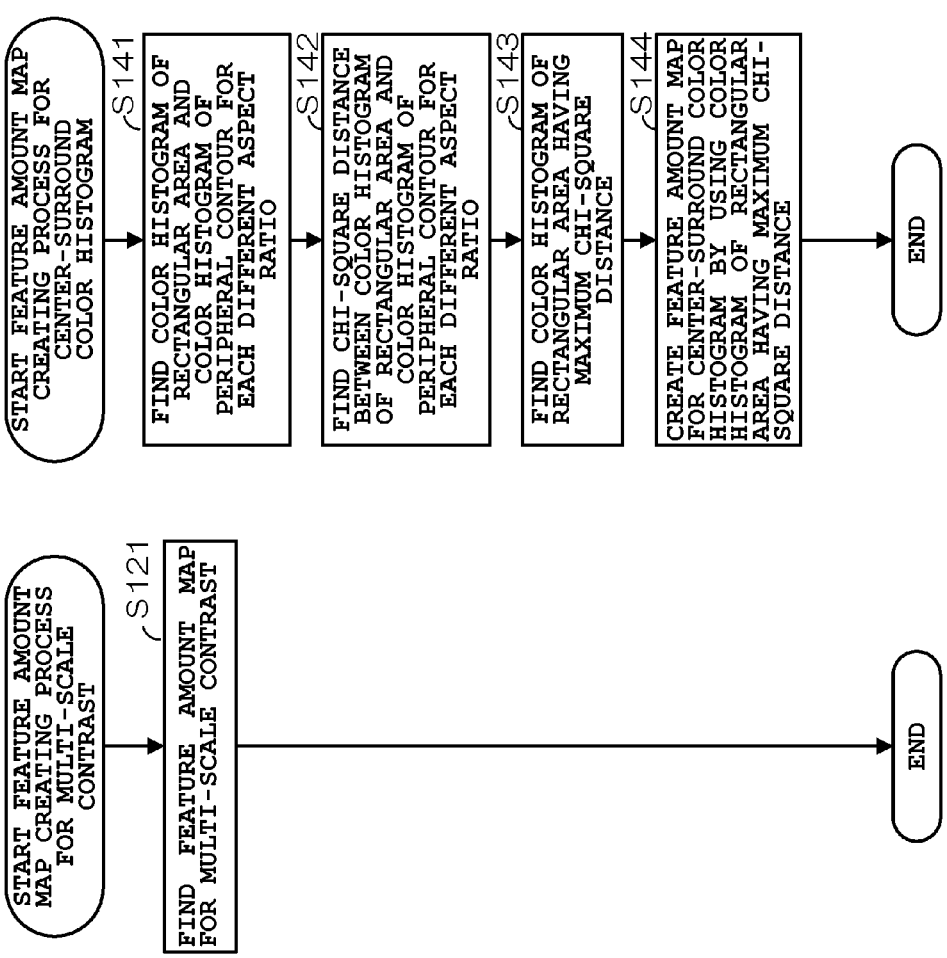
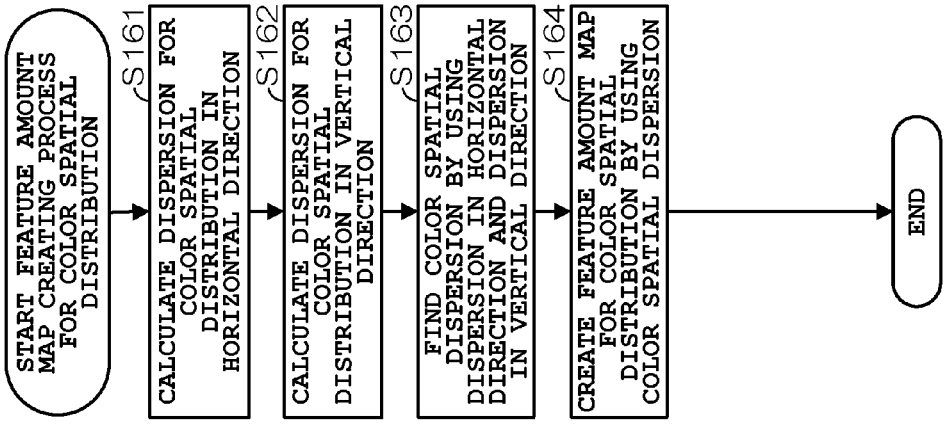
FIG. 12A, FIG. 12B, FIG. 12C

IMAGE SEARCH SYSTEM, IMAGE SEARCH APPARATUS, IMAGE SEARCH METHOD AND COMPUTER-READABLE STORAGE MEDIUM

CROSS-REFERENCE TO RELATED APPLICATION

This application is based upon and claims the benefit of priority from the prior Japanese Patent Application No. 2012-063791, filed Mar. 21, 2012, the entire contents of which is incorporated herein by reference.

BACKGROUND OF THE INVENTION

1. Field of the Invention

The present invention relates to an image search system, an image search apparatus, an image search method, and a computer-readable storage medium having an image search program stored therein for imaging, for example, a flower and identifying the flower.

2. Description of the Related Art

People may want to know the name of a flower seen in the fields or by the roadside. A technology has been suggested in which a target plant such as a flower is imaged, a feature amount is extracted from the imaged flower, and a search for the target plant is made from a database having stored therein names and families of nationwide wild plants, their feature amount information corresponding to the feature amount, and plant sample images (for example, refer to Japanese Patent Application Laid-Open (Kokai) Publication No. 2007-133816).

In another suggested technology (for example, refer to Japanese Patent Application Laid-Open (Kokai) Publication No. 2002-203242), from digital images of flowers and leaves, images of a flower and a leaf of a target are extracted by using a clustering method, and information obtained from the extracted flower and leaf is taken as a feature amount. A single or plurality of feature amounts are thus found, and the found feature amounts and feature amounts of various plants registered in a database in advance are analyzed by using a statistical scheme to determine the wild plant type.

A technology of dividing an image including a main subject such as a flower into a flower area and a background image area by using a Graph Cuts method has been suggested in, for example, Japanese Patent Application Laid-Open (Kokai) Publication No. 2011-035636.

However, in the technologies disclosed in Japanese Patent Application Laid-Open (Kokai) Publication No. 2007-1333816 and Japanese Patent Application Laid-Open (Kokai) Publication No. 2002-203242, the recognition ratio is on the order of 55%, and a selecting process with human eyes is inevitably indispensable. In the conventional technologies, a user interface for letting a person to select does not always have excellent usability.

SUMMARY OF THE INVENTION

The present invention has been conceived in light of the above-described problems, and is to provide an image search system, an image search apparatus, an image search method, and a computer-readable storage medium having an image search program stored therein for identifying an imaged plant such as flower (a target to be imaged and searched for is referred to as an object), with an effective, easy-to-use user interface.

In order to solve the above-described problems, in accordance with one aspect of the present invention, there is provided an image search apparatus that identifies an image of an imaged object by searching a database, comprising: a database which has feature information stored in association with object sample images, object names, and sample images of another portion of the object; an extracting section which extracts a plurality of object sample images having a high similarity to the image of the imaged object as candidate images by comparing feature information of the image of the imaged object and the feature information stored in the database; a first display control section which causes the image of the imaged object, the candidate images that are the plurality of extracted object sample images, and object names corresponding to the candidate images to be arranged and displayed on a display section; and a second display control section which changes the plurality of candidate images displayed on the display section to corresponding sample images of the other portion of the object and causes the corresponding sample images to be displayed on the display section.

In accordance with another aspect of the present invention, there is provided an image search system that identifies an image of an imaged object by searching a database, comprising: a database which has feature information stored in association with object sample images, object names, and sample images of another portion of the object; an extracting section which extracts a plurality of object sample images having a high similarity to the image of the imaged object as candidate images by comparing feature information of the image of the imaged object and the feature information stored in the database; a first display control section which causes the image of the imaged object, the candidate images that are the plurality of extracted object sample images, and object names corresponding to the candidate images to be arranged and displayed on a display section; a second display control section which changes the plurality of candidate images displayed on the display section to corresponding sample images of the other portion of the object and causes the corresponding sample images to be displayed on the display section; a communication terminal; and a server connected to the communication terminal via a network, wherein the display section is comprised in the communication terminal, and the database is comprised in the server.

In accordance with another aspect of the present invention, there is provided a non-transitory computer-readable storage medium having stored thereon an image search program that is executable by a computer of an image search apparatus that identifies an image of an object imaged by an imaging section by searching a database having feature information stored in association with object sample images, object names, and sample images of another portion of the object, the program being executable by the computer to perform functions comprising: extraction processing for extracting a plurality of object sample images having a high similarity to the image of the imaged object as candidate images by comparing feature information of the image of the imaged object and the feature information stored in the database; first display control processing for causing the image of the imaged object, the candidate images that are the plurality of extracted object sample images, and object names corresponding to the candidate images to be arranged and displayed on a display section; and second display control processing for changing the plurality of candidate images displayed on the display section to corresponding sample images of the other portion of the object and causing the corresponding sample images to be displayed on the display section.

In accordance with another aspect of the present invention, there is provided a non-transitory computer-readable storage medium having stored thereon an image search program that is executable by a computer of a communication terminal including an imaging section and a display section, the program being executable by the computer to perform functions comprising: imaging processing for imaging an image of an object; transmission processing for transmitting the image of the imaged object to a server via a network; reception transmission for receiving candidate images that are a plurality of object sample images having a high similarity to the image of the imaged object, object names corresponding to the candidate images, and sample images of another portion of the object corresponding to the candidate images, which are sent from the server; first display control processing for causing the image of the imaged object, the received candidate images that are the plurality of extracted object sample images, and the received object names corresponding to the candidate images to be arranged and displayed on a display section; and second display control processing for changing the plurality of candidate images displayed on the display section to the sample images of the other portion of the object corresponding to the candidate images and causes the sample images to be displayed on the display section.

In accordance with another aspect of the present invention, there is provided a non-transitory computer-readable storage medium having stored thereon an image search program that is executable by a computer of a server that identifies an image of an object sent from an external communication terminal via a network by searching a database which has feature information stored in association with object sample images, object names, and sample images of another portion of the object, the program being executable by the computer to perform functions comprising: extraction processing for extracting a plurality of object sample images having a high similarity to the image of the imaged object as candidate images by comparing feature information of the image of the object sent from the communication terminal and feature information stored in the database; processing for reading, from the database, the candidate images that are the plurality of extracted object sample images, object names corresponding to the candidate images, and respective sample images of the other portion of the object corresponding to the candidate images, and transmitting the read candidate images, object names, and sample images to the communication terminal; and identification processing for, when one of the candidate images is selected in the communication terminal, receiving selection information and identifying an object name corresponding to the sent object image.

In accordance with another aspect of the present invention, there is provided an image search method for identifying an image of an object imaged by an imaging section by searching a database having feature information stored in association with object sample images, object names, and sample images of another portion of the object, comprising: an extracting step of extracting a plurality of object sample images having a high similarity to the image of the imaged object as candidate images by comparing feature information of the image of the imaged object and the feature information stored in the database; a first display control step of causing the image of the imaged object, the candidate images that are the plurality of extracted object sample images, and object names corresponding to the candidate images to be arranged and displayed on a display section; and a second display control step of changing the plurality of candidate images displayed on the display section to corresponding sample images of the other portion of the object and causing the corresponding sample images to be displayed on the display section.

According to the present invention, an object such as an imaged flower can be quickly searched for with a simple operation.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 11A to FIG. 11C are flowcharts of examples of feature amount map creation processing of the second embodiment; and FIG. 12A to FIG. 12C are flowcharts of other examples of the feature amount map creation processing of the second embodiment.

DETAILED DESCRIPTION OF THE PREFERRED EMBODIMENTS

First Embodiment

A first embodiment of the present invention is described below.

Figure 1:
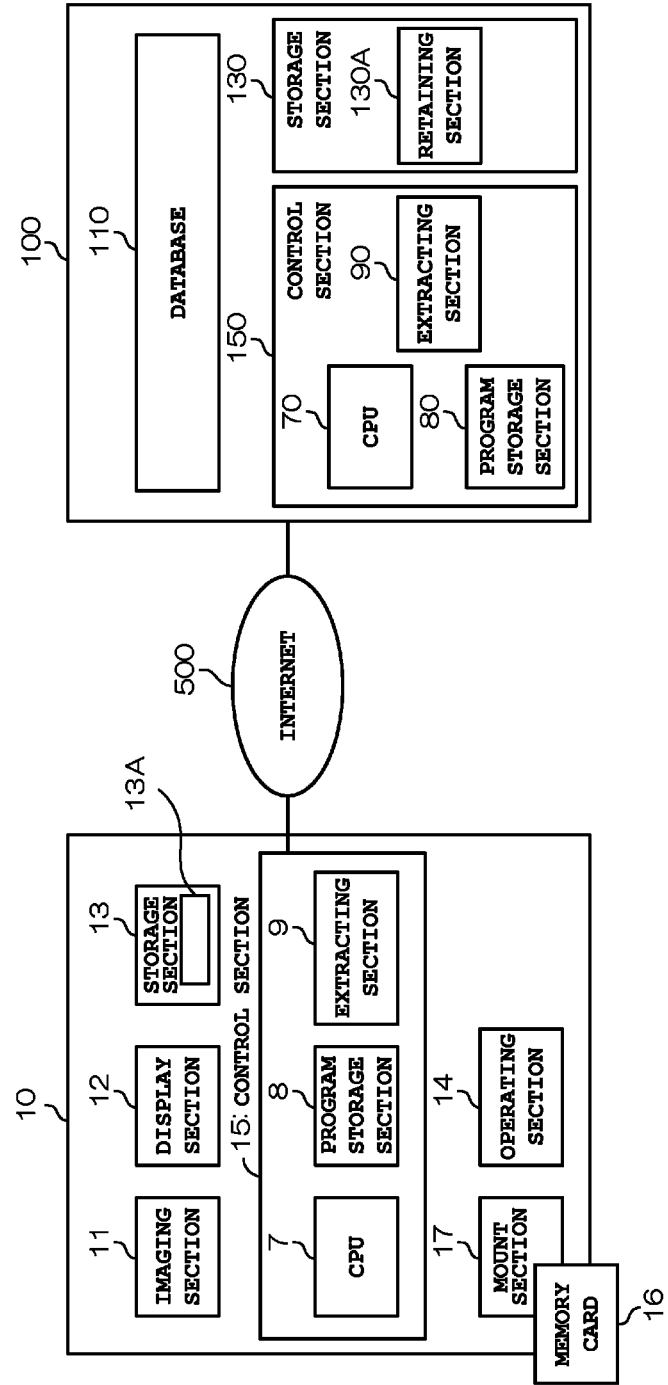
FIG. 1 is a diagram for describing an entire structure of a network system according to a first embodiment of the present invention.

FIG. 1 is a diagram for describing an entire structure of a network system according to a first embodiment of the present invention.

Reference numeral 10 denotes a communication terminal such as a smartphone, including an imaging section 11 for imaging an image, a display section 12 that displays an image of an imaged flower, a candidate image, and others, a storage section 13 that functions as a work memory, an operating section 14 for selecting an image, inputting data of an attention point, and others, a control section 15 that controls an entire communication terminal, and a mount section 17 that mounts a memory card 16. The imaging section 11 has a function of imaging a still image and performing continuous imaging or imaging a moving image. In the specification, performing continuous imaging and imaging a moving image are regarded as the same. The storage section 13 includes a retaining section 13A where a plurality of captured images are retained. The control section 15 includes a Central Processing Unit (CPU) 17 (extracting section; first display control section; second display control section; determining section; guiding section), and also includes a program storage section 8 that stores various programs to be executed at the communication terminal 10 for flower search and an extracting section 9 that makes a flower search by executing a program according to a predetermined algorithm to extract a candidate image.

The communication terminal 10 is connected to a server 100 via the Internet 500 with a portable phone circuit, a wireless LAN, or the like.

The server 100 includes a database 110 having stored therein feature information for identifying an image of a flower imaged by the imaging section 11 of the communication terminal 10 in association with flower sample images, flower names, leaf sample images, and images that indicate attention points for narrowing down the flower names.

Reference numeral 130 denotes a storage section that functions as a work memory, and reference numeral 150 denotes a control section that controls an entire server. The control section 150 includes a CPU 70 (extracting section; first display control section; second display control section; determining section; guiding section), and also includes a program storage section 80 having stored therein various programs to be executed on the CPU 70 for flower search. The control section 150 further includes an extracting section 90 that makes a flower search by executing a program according to a predetermined algorithm to extract a candidate image. Therefore, even if the extracting section 9 is not included on a communication terminal 10 side, a flower search can be made by the extracting section 90 by sending the program to the server 100. The storage section 130 includes a retaining section 130A that has stored therein flower images sent (posted) from a plurality of users.

Figure 2:
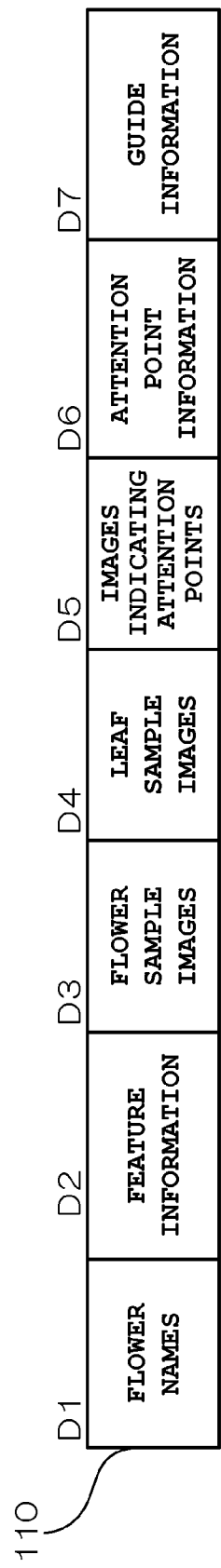
FIG. 2 is a diagram of the structure of a database of the present embodiment.

FIG. 2 is a diagram of the structure of the database 110.

The database 110 has feature information D2 stored in association with flower sample images D3, flower names D1, leaf sample images D4, and images D5 indicating attention points for narrowing down the flower names. Also, the attention points including a blooming season, flower size, petal color, leaf shape, height, habitat, and others are stored as attention point information D6 for narrowing down flower candidates. Furthermore, guide information D7 is stored, including a growing guide depicting the seed, bud, growing, flower bud, blooming, and others of the flower and a care guide such as how to apply fertilizer and water. The guide information D7 may be display data or voice data. With the flower names D1 as indexes, the flower sample images D3, the leaf sample images D4, and others are stored. For each flower name, images of a plurality of flower states can be stored as capacity allows, such as images before blooming, bud season, during blooming, and during bearing.

Next, a procedure of imaging a flower at the communication terminal 10 and making a flower search in practice is described.

FIG. 3A, FIG. 3B, FIG. 4A, FIG. 4B, FIG. 5A, and FIG. 5B are diagrams for describing a change of a display state of the display section 12 of the present embodiment.

Figure 3A:
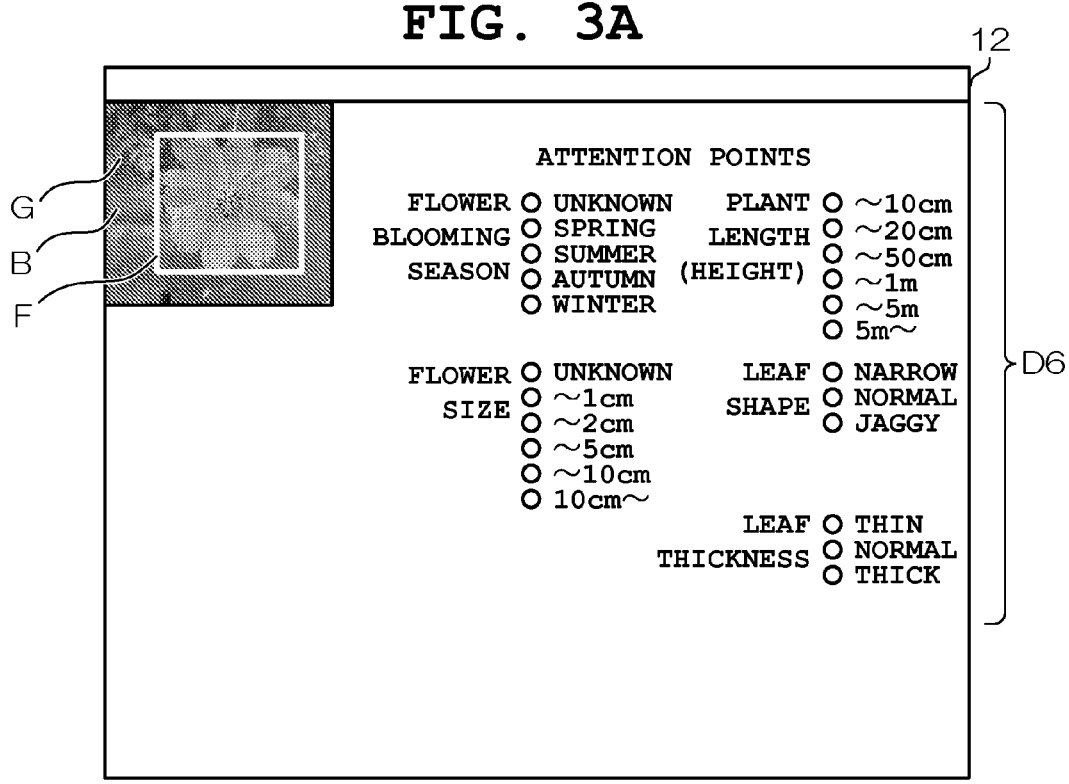
FIG. 3A and FIG. 3B are diagrams for describing a change of a display state of a display section 12 of the present embodiment.

Assume that a flower is imaged by the imaging section 11 of the communication terminal 10. Here, as depicted in FIG. 3A, a captured image G is displayed on the display section 12. The captured image G includes an image F of the flower, which is a main subject, and a background B. Here, an image already imaged and retained in the storage section 13 or the memory card 16 may be selected. D6 displays attention point information for narrowing down candidates based on information such as the blooming season, flower size, height, and leaf shape.

Figure 6:
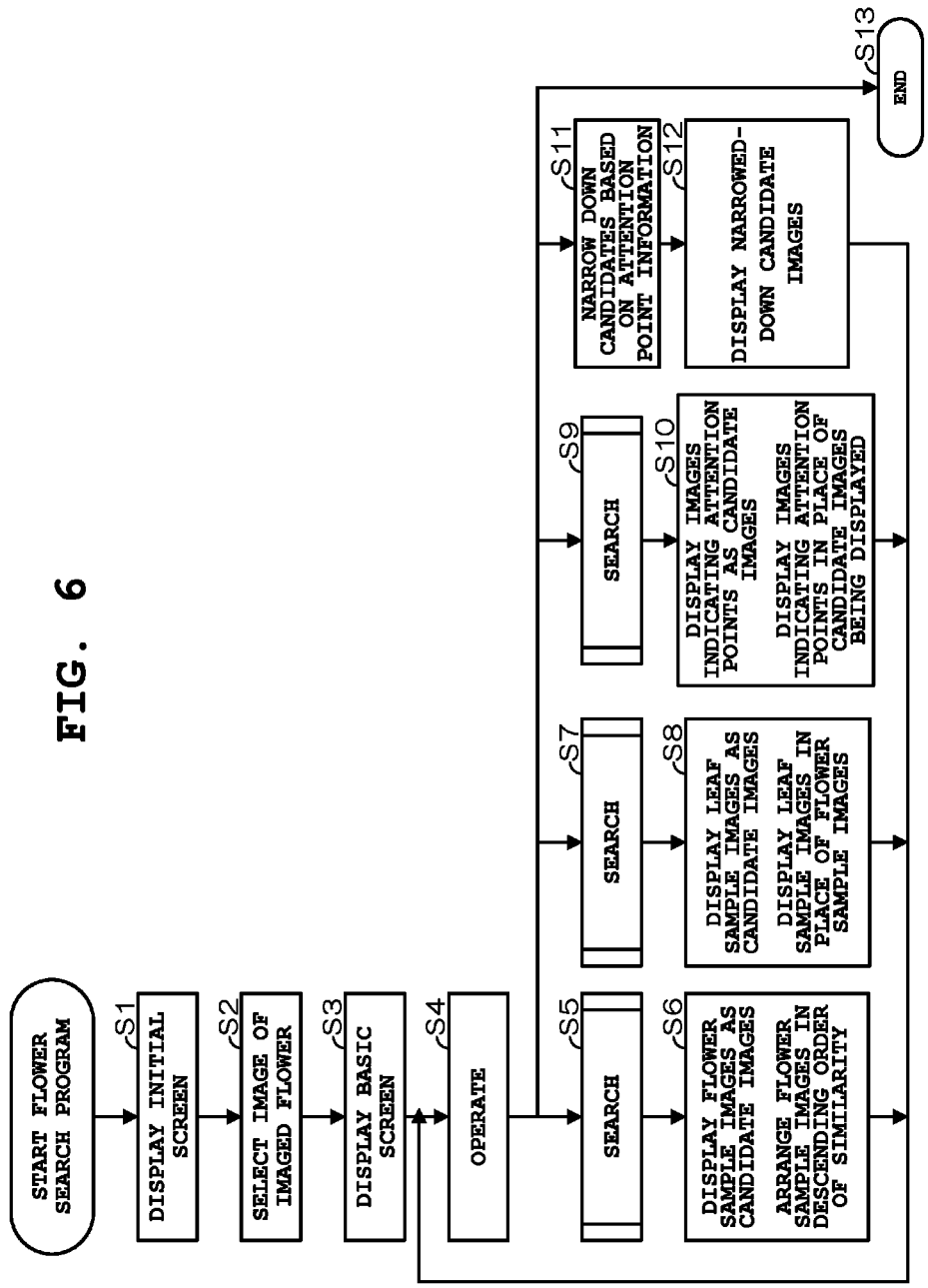
FIG. 6 is a flowchart of the entire operation of a flower search system of the present embodiment.

With the operation of the operating section 14 of the communication terminal 10, the captured image G is selected, and a flower search program, which will be described further below with reference to FIG. 6, is executed by the control section 15.

Figure 3B:
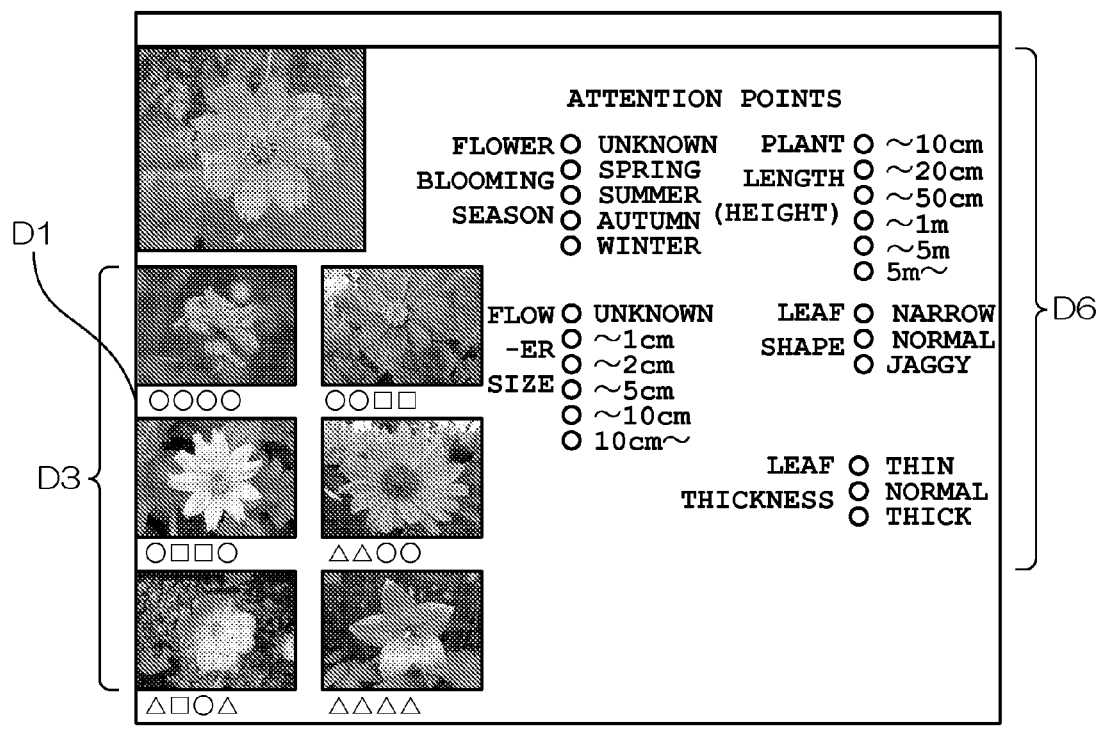

In the control section 15, with the operation of the extracting section 9, feature information of the image F of the imaged flower and feature information D2 stored in the database 110 are compared with each other. With this, a plurality of flower sample images D3 having a high similarity to the image F of the imaged flower are extracted as candidate images. A display example of the display section 12 at this time is depicted in FIG. 3B. That is, the captured image G including the flower image F, the plurality of flower sample images D3 extracted as candidate images, and their respective flower names D1 are arranged on display, and attention information D6 for narrowing down the flower candidates is further arranged on display. The plurality of flower candidate images D3 are assumed to be arranged in descending order of similarity.

In this state, when a user cannot identify that the image G of the imaged flower and any of the flower sample images D3 being displayed match each other, with a predetermined operation of the operating section 14, the flower sample images D3 are changed all at once to leaf images D4 corresponding to the flower for display at the positions where the flower sample images D3 have been displayed, as depicted in FIG. 4. With this, the user can make a comparison by using not only flower shapes but also leaf shapes.

Figure 4A:
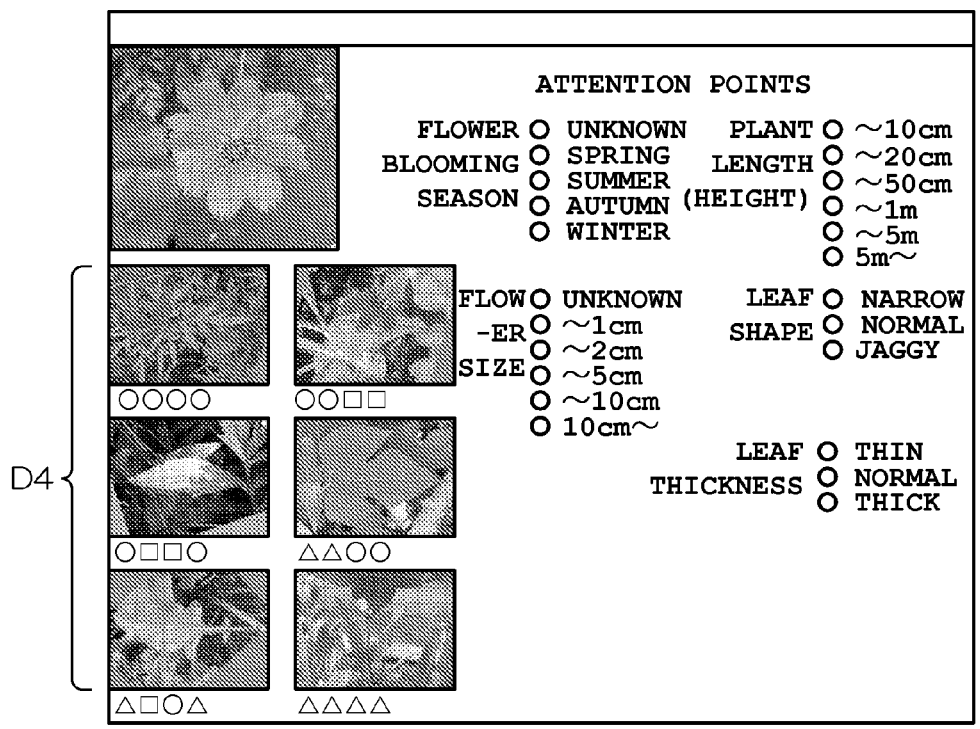
FIG. 4A and FIG. 4B are diagrams for describing a change of the display state of the display section 12 of the present embodiment.
Figure 4B:
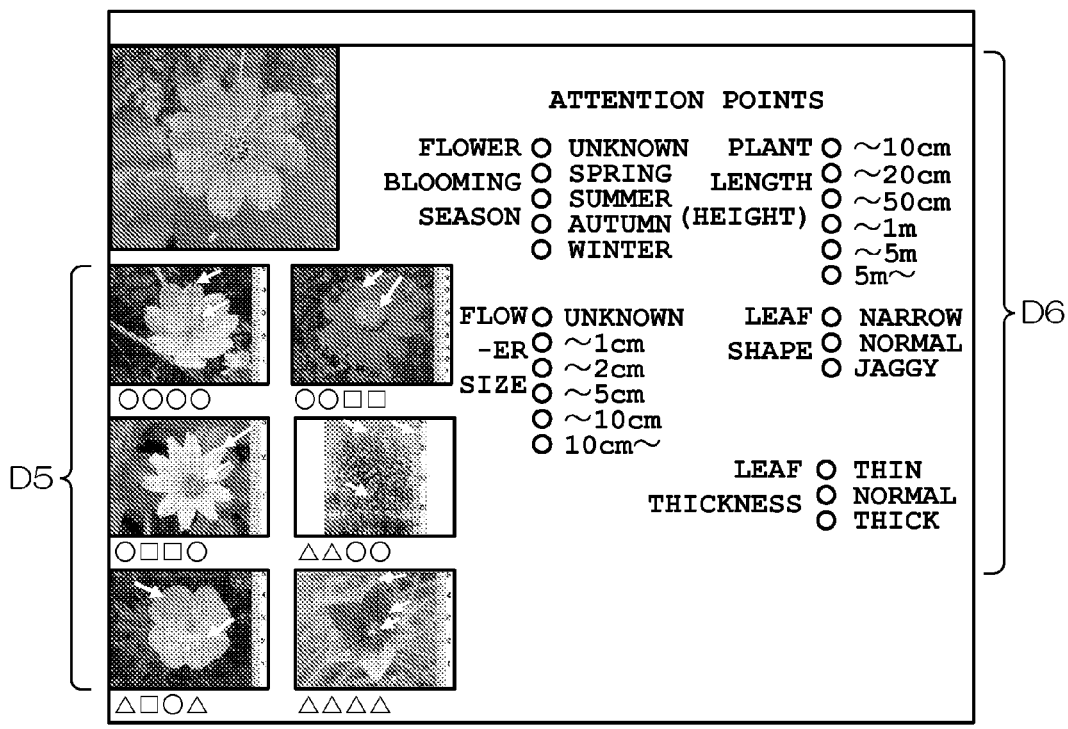

If a determination cannot still be made, with a predetermined operation of the operation section 14, images D5 indicating attention points for narrowing down the flower names as depicted in FIG. 4B. Since the attention points are indicated by arrows in the attention-point-indicating images D5, when the user carefully compares the attention points or specifies a size, color, growing season, height, and others of the flower as attention points in the attention point information D6, the flowers can be narrowed down.

Figure 5A:
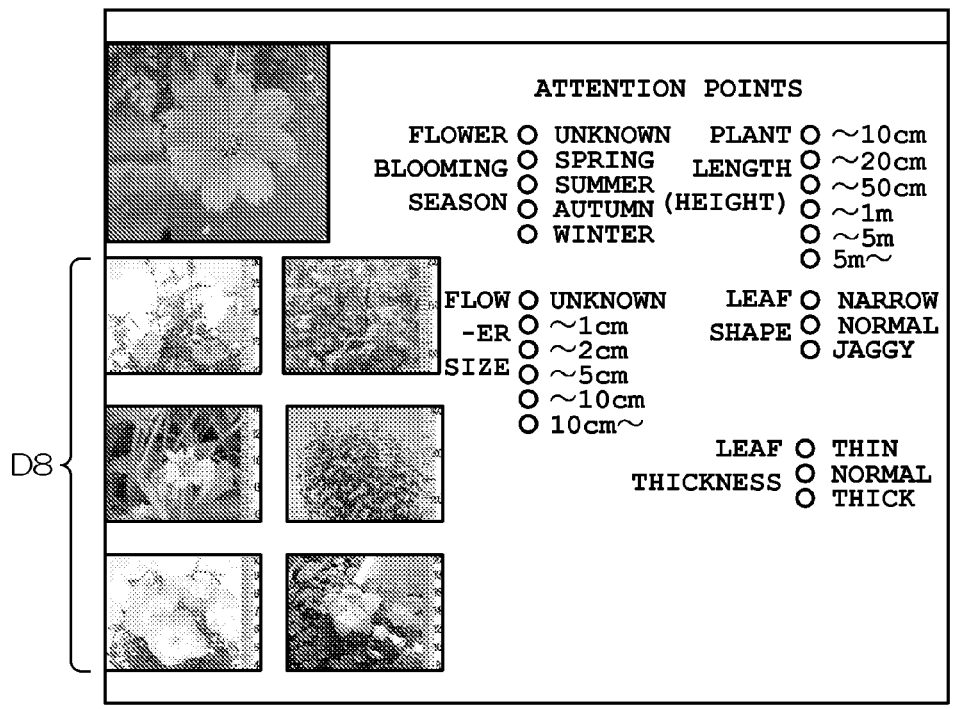
FIG. 5A and FIG. 5B are diagrams for describing a change of the display state of the display section of the present embodiment.
Figure 5B:
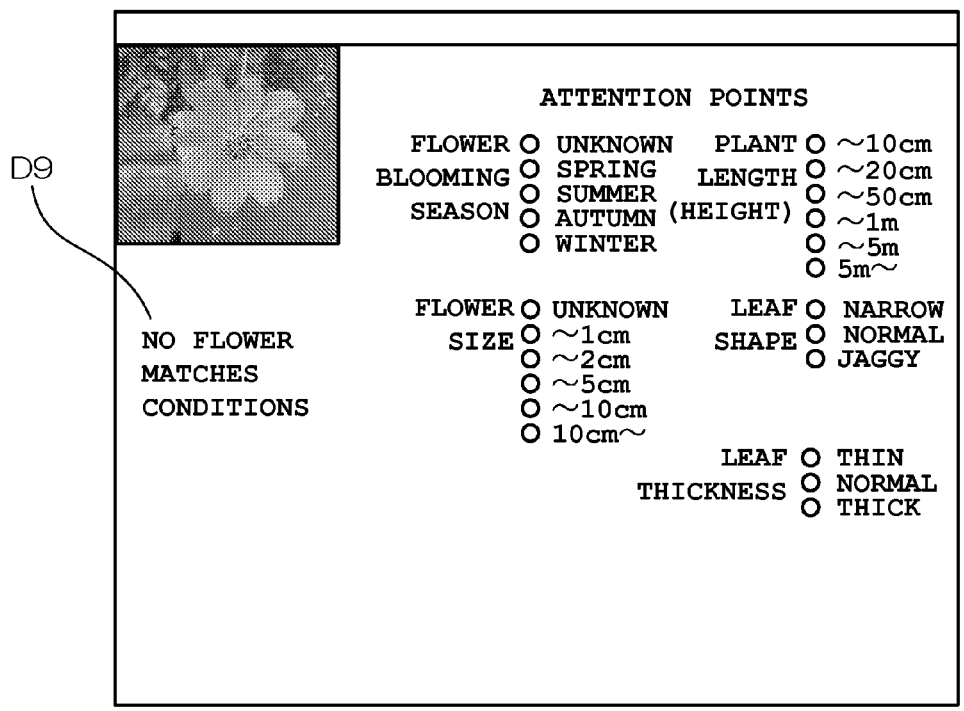

As depicted in FIG. 5A, whole images D8 can be displayed in place of the leaf sample images D4. If no name of a flower with a similarity higher than a predetermined threshold can be found, a guide display D9 "NO FLOWER MATCHES CONDITIONS" is made as depicted in FIG. 5B.

The above-described operation is described by using a flowchart.

FIG. 6 is a flowchart of the entire operation of a flower search system of the present embodiment, the operation achieving the display described above. That is, when a flower search program stored in the program storage section 8 of the control section 15 is started, a predetermined menu screen is first displayed on the display section 12 (Step S1). Here, a flower is imaged, or an image already captured and retained in the retaining section 13A of the storage section 13 is selected (Step S2). Then, a basic screen depicted in FIG. 3A is displayed (Step S3). In this state, various operations can be performed by the operating section 14. Upon a search instruction, the procedure goes to Step S5, accessing the database 110 in the server 100 via the network such as the Internet 500 and searching and extracting flower candidate images (Step S5). Details will be described further below with reference to FIG. 9.

Based on the extraction results, flower sample images are displayed as depicted in FIG. 3B (Step S6). The flower sample images D3 are arranged in parallel with the flower names D1 from upper left in descending order of similarity. In this state, if the user can identify the name of the imaged flower, the procedure can end here. However, when there are a plurality of similar flowers and the user cannot narrow down, an operation of specifying "leaf" is performed, thereby causing the procedure to go from Step S4 to Step S7. In place of the flower sample images being displayed in FIG. 3B, leaf sample images D4 corresponding to the flower and stored in the database 110 are read, and the leaf sample images are displayed in place of the flower sample images in an area where the flower sample images have been displayed as depicted in FIG. 4A (Step S8). Therefore, instead of arranging leaf candidate images in descending order of leaf similarity, leaf sample images are arranged in descending order of similarity of the flower sample images. This less confuses the user than always displaying candidates in descending order of similarity. Also at the searching Step S7, image recognition processing is not performed as at Step S5, and the leaf sample images D4 corresponding to the leaf are extracted from the database 110. The operation of specifying "leaf" may be performed with a button "LEAF" or by clicking a leaf portion of the captured image G being displayed.

If the user cannot still identify the flower name, the procedure goes to Step S9 and Step S10 with a predetermined operation. As depicted in FIG. 4B, images D5 indicating attention points for narrowing down the flower names are displayed as described above. Since the attention points are indicated by arrows in the attention-point indicating images D5, when the user carefully compares the attention points or specifies a size, color, growing season, height, and others of the flower as attention points in the attention point information D6, the flowers can be narrowed down.

When any of the attention information is specified before searching the flowers, the procedure goes to Step S11. For example, if the size, color, growing season, height, and others of the flower as attention points are specified, the attention point information D6 in the database 110 is searched, and flowers not matching the conditions are excluded from candidates. With this, when search processing similar to that at Step S5 is performed, search targets can be narrowed down, thereby reducing search time. A display mode of the display section 12 is similar to that of FIG. 3B.

If the user can identify the name of the imaged flower, the flow ends with an end operation (Step S13).

Not only the leaf sample images D4 but also the whole sample images D8 may be prepared (FIG. 5A).

If any similar flower sample image cannot be extracted as a result of the search at Step S5, the guide display D9 "NO FLOWER MATCHES CONDITIONS" is made as depicted in FIG. 5B.

Figure 7:
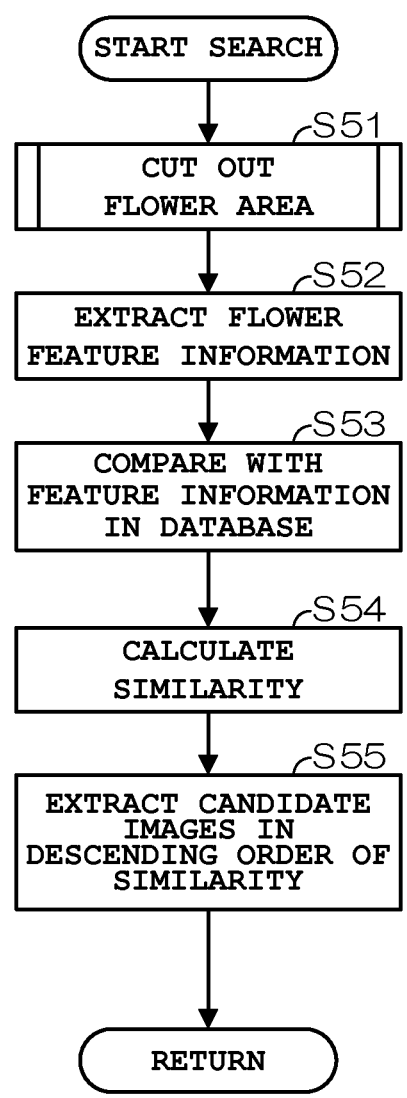
FIG. 7 is a flowchart of a flower search program of the present embodiment.

FIG. 7 is a flowchart of an operation of searching flowers and extracting candidate images at Step S5 of FIG. 6. A scheme of calculating similarity between feature amounts targeted for image data is known, and is therefore not described in detail herein. Also, as a scheme of cutting out a subject, a Graph Cuts method is adopted, and an example of a specific scheme of the Graph Cuts method will be described in detail in a second embodiment and therefore is not described in detail herein.

First, processing for cutting out the flower image F, which is a main subject, from the captured image G is performed (Step S51). Also, feature information is extracted from an area of the cut-out flower (Step S52).

Then, a comparison is made with the feature information D2 stored in the database 110 (Step S53).

A similarity between the feature information in the database 110 for comparison and feature information extracted from the flower area is calculated (Step S54), and, for example, six flower sample images are extracted in descending order of similarity (Step S55). Then, as depicted in FIG. 3A, the flower sample images are arranged for display in order of similarity (Step S6 of FIG. 6).

Second Embodiment

Next, a second embodiment is described. The present embodiment supports the case in which the subject is imaged as moving pictures, and exemplifies a specific scheme of "cutting out the flower area" (Step S51) in FIG. 7. According to this scheme, a flower area can be extracted from not only a still picture but also a moving image. Portions common to the first embodiment are provided with common reference characters and are not described herein.

In image extraction processing in the second embodiment, a Graph Cuts method is applied. The Graph Cuts method is one of schemes of solving a problem of segmentation (image area division) as a problem of energy minimization. With the Graph Cuts method, a global solution of an energy function defined from each area can be found and, as a result, segmentation using characteristics in both area and boundary can be advantageously achieved.

Figure 8:
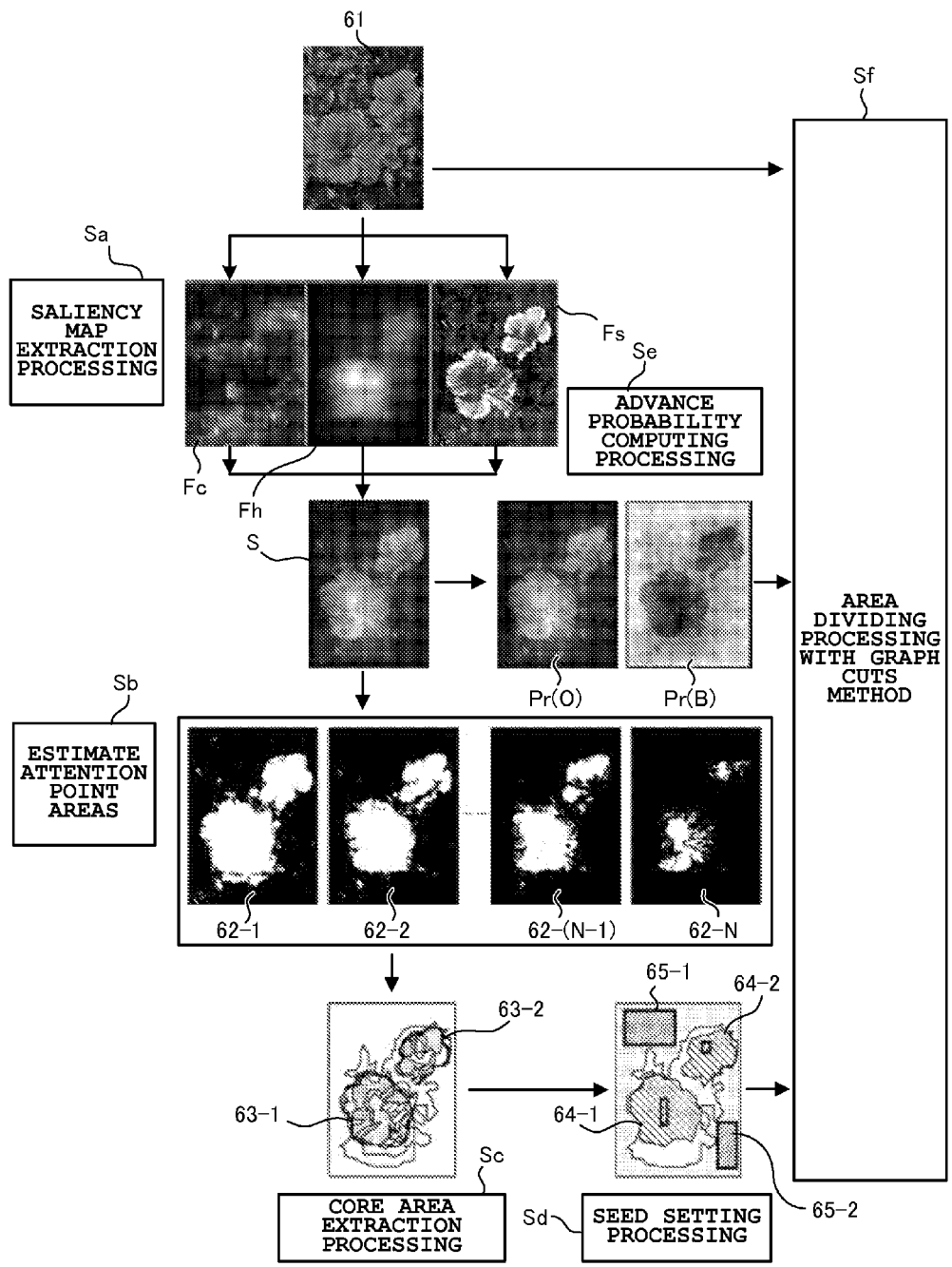
FIG. 8 is a diagram of a general outline of flower area extraction processing of a second embodiment.

In an example of FIG. 8, the following moving image extraction processing is performed on a processing target image 61 (corresponding to the captured image G).

At Step Sa, for example, the CPU 7 performs the following processing as saliency map extraction processing.

That is, the CPU 7 creates feature amount maps of a plurality of types from contrasts of feature amounts of a plurality of types, for example, color, azimuth, and luminance. A series of processing until a feature amount map of one predetermined type is created from among the plurality of these types are hereinafter referred to as feature amount map creation processing. A detailed example of each of the feature amount map creation processing will be described further below with reference to FIG. 11A to FIG. 11C and FIG. 12A to FIG. 12C.

For example, in the example of FIG. 8, a feature amount map Fc is created as a result of feature amount map creation processing for multi-scale contrast in FIG. 12A, which will be described further below. Also, a feature amount map Fh is created as a result of feature amount map creation processing for a Center-Surround color histogram in FIG. 12B, which will be described further below. Furthermore, a feature amount map Fs is created as a result of feature amount map creation processing for a color space distribution in FIG. 12C.

Next, the CPU 7 unifies the feature amount maps of the plurality of types to find a saliency map. For example, in the example of FIG. 8, the feature amount maps Fc, Fh, and Fs are unified to find a saliency map S.

The processing at Step Sa corresponds to processing at Step S22 of FIG. 9, which will be described further below.

At Step Sb, the CPU 7 uses a saliency map to estimate an image area with a high possibility of attracting human visual attention (hereinafter referred to as an attention point area) from among processing target images. For example, in the example of FIG. 8, an attention point area 62-1 to an attention point area 62-N (N is an integer value equal to or larger than 1 and, in the example of FIG. 8, is an integer value equal to or larger than at least 4) of a plurality of stages are estimated from the processing target image 61 by using the saliency map S.

An attention point area 62-*r* (r is any of integer values among 1 to N) is an area having a value higher than a predetermined threshold Sth-r when the saliency map S is binarized by using the threshold Sth-r. Specifically, for example, in the example of FIG. 6, a threshold Sth-1 for use in estimating the attention point area 62-1 is 70, a threshold Sth-2 for use in estimating the attention point area 62-2 is 90, a threshold Sth-(N−1) for use in estimating the attention point area 62-(N−1) is 150, a threshold Sth-N for use in estimating the attention point area 62-N is 170.

The processing at Step Sb corresponds to processing at Step S24 of FIG. 9, which will be described further below.

In the area dividing processing with the Graph Cuts method at Step Sf, the processing target image 61 is segmented (divided) into a main subject area and a background area. To achieve this area dividing processing, labels and seeds as samples of the main subject area and the background area are required. For this reason, the following processing at Steps Sc and Sd are performed.

At Step Sc, for example, the CPU 7 performs the following processing as core area extraction processing.

That is, the CPU 7 uses the attention point areas 62-1 to 62-N of the plurality of stages to extract a core area of each attention point area. For example, a core area of each attention point area is extracted based on an area where a change in the attention point areas 62-1 to 62-N of the plurality of stages is small or a redundant area of the attention point areas 62-1 to 62-N of the plurality of stages. Specifically, for example, in the example of FIG. 8, core areas 63-1 and 63-2 are extracted from the attention point areas.

The processing at Step Sc corresponds to processing at Step S25 of FIG. 9, which will be described further below.

At Step Sd, for example, the CPU 7 performs the following processing as seed setting processing.

Specifically, the CPU 7 sets a seed of the main subject area and a seed of the background area based on, for example, the core areas of the attention point areas.

The setting scheme itself is not particularly restrictive. For example, it is possible to adopt a scheme of setting the core area of the attention point area as it is as a seed of the main subject area. It is also possible to adopt a scheme of setting a rectangular area inscribed or circumscribed about the core area of the attention point area, or a barycenter or skeletal line of the attention point area as a seed of the main subject area. It is further possible, for example, to adopt a scheme of setting a core area with low saliency, a rectangular area other than the attention point area, or a barycenter or skeletal line of an area other than the attention point area as a seed of the background area.

For example, in the example of FIG. 8, seeds 64-1 and 64-2 of the main subject area and seeds 65-1 and 65-2 of the background area are set.

The processing at Step Sd corresponds to processing at Step S26 of FIG. 9, which will be described further below.

Also, to achieve the area dividing processing with the Graph Cuts method at Step Sf, an advance probability Pr(O) of the main subject area and an advance probability Pr(B) of the background area are required.

Thus, at Step Se, the CPU 7 performs, for example, the following processing as advance probability computing processing.

That is, the CPU 7 computes a value of the saliency map S (here, a value obtained by normalizing the saliency map value in a range of 0 to 1) as the advance probability Pr(O) of the main subject area. The CPU 7 also computes a value obtained by reversing the saliency map S (a value of 1-the value of the saliency map), that is, 1−Pr(O), as the advance probability Pr(B) of the background area. For example, in the example of FIG. 8, the advance probability Pr(O) of the main subject area and the advance probability Pr(B) of the background area are obtained from the saliency map S depicted in FIG. 8.

The processing at Step Se corresponds to processing at Step S23 of FIG. 9, which will be described further below.

Next, at Step Sf, the CPU 7 performs the area dividing processing with the Graph Cuts method.

Here, in a conventional Graph Cuts method, in order to learn a substance and a background, labels and seeds as samples of a substance area (a main subject area) and a background area are manually given. By contrast, in the present embodiment, seeds of the main subject area and seeds of the background area automatically set in the processing at Step Sd can be used. As a result, there is no need to manually input seeds as in the conventional technology or to learn the substance and background.

Furthermore, the advance probability Pr(O) of the main subject area and the advance probability Pr(B) of the background area computed in the processing at Step S3 are based on the saliency map S, and can be adopted as advance probabilities of t-link in the Graph Cuts method. As a result, appropriate spatial information of the main subject area can be obtained.

As a result of the area dividing processing with the Graph Cuts method at Step Sf, as described above, the processing target image 61 is divided into a main subject area and a background area.

The processing at Step Sf corresponds to processing at Step S27 of FIG. 9, which will be described further below.

Then, data of the main subject area is extracted as image data of a "moving image part" (refer to Step S28 of FIG. 9, which will be described further below). This extracting scheme is not particularly restrictive, and so-called cut-out extraction or so-called alpha-channel extraction may be used.

With these processing at Steps Sa to Sf being repeatedly performed for each of the plurality of frame image data, moving image data of the "moving image part" and others are extracted.

Figure 9:
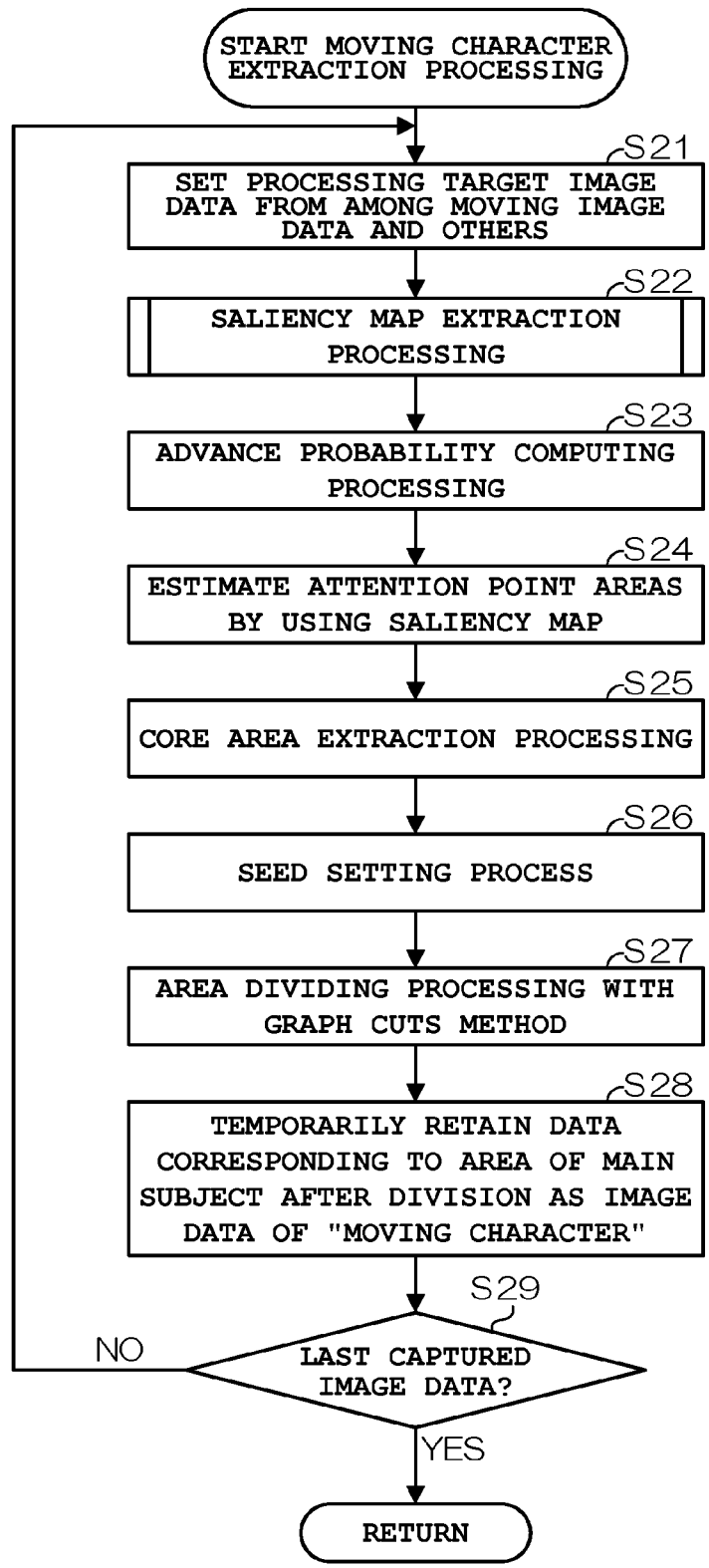
FIG. 9 is a detailed flowchart of the flower area extraction processing of the second embodiment.

FIG. 9 is a flowchart of a detailed example of a flow of the moving image extraction processing.

At Step S21, from among moving image data obtained as a result of loop processing at Steps S5 to S8 of FIG. 6 and others, the CPU 7 sets predetermined captured image data (frame image data) as processing target image data.

At Step S22, the CPU 7 performs saliency map extraction processing to find a saliency map. A general outline of the saliency map extraction processing is as described above as the processing at Step Sa of FIG. 8, and its details will be described further below with reference to FIG. 10.

At Step S23, the CPU 7 performs advance probability computing processing. With this, as described above as the processing at Step Se of FIG. 8, the advance probability Pr(O) of the main subject area and the advance probability Pr(B) of the background area can be obtained.

At Step S24, the CPU 7 uses the saliency map to estimate an attention point area. With this, as described above as the processing at Step Sb of FIG. 8, attention point areas of a plurality of stages are estimated.

At Step S25, the CPU 7 uses the attention point areas of the plurality of stages to perform core area extraction processing. With this, as described above as the processing at Step Sc of FIG. 8, a core area of each attention point area is extracted.

At Step S26, the CPU 7 uses the core area of the attention point area to perform seed setting processing. With this, as described above as the processing at Step Sd of FIG. 8, seeds of the main subject area and seeds of the background area are set.

At Step S27, the CPU 7 uses the advance probability Pr(O) of the main subject area and the advance probability Pr(B) of the background area and the seeds of the main subject area and the seeds of the background area to perform area dividing processing with a Graph Cuts method. With this, a frame image corresponding to processing target image data is segmented (divided) into a main subject area and a background area, as described above as the processing at Step Sf of FIG. 8. Thus, at Step S28, the CPU 7 temporarily retains data corresponding to the main subject area after division as image data of "moving images" in the storage section 13 or the like.

At Step S29, the CPU 7 determines whether the processing target image data is final captured image data (frame image data). If the processing target image data is not final captured image data, NO is determined at Step S29, and the processing returns to Step S21. That is, for each of the plurality of captured image data configuring moving image data or the like, the loop processing at Step S21 to Step S29 is repeatedly performed, thereby sequentially extracting image data of "moving images".

Then, when the final captured image data is set as processing target image data and the processing at Step S22 to Step S28 are preformed, YES is determined at the next Step S29, and then the moving image extraction processing ends. As a result, moving image data of "moving images" and others are configured of image data of the plurality of "moving images" extracted from the plurality of respective captured image data. Thus, when the moving image extraction processing ends, that is, when the processing at Step S9 of FIG. 6 ends, as described above, in the processing at Step S10 and Step S11, the moving image data of the "moving images" and others are compressed and encoded, and the resultant encoded image data is recorded on the memory card 16 or the like.

Next, of the moving image extraction processing, a detailed example of the saliency map extraction processing at Step S22 (Step Sa of FIG. 8) is described.

As described above, in the attention point area estimation processing, a saliency map is created to estimate an attention point area. Therefore, for example, the Treisman's feature integration theory or a saliency map by Itti, Koch, et al. can be applied to the attention point area estimation processing.

Figure 10:
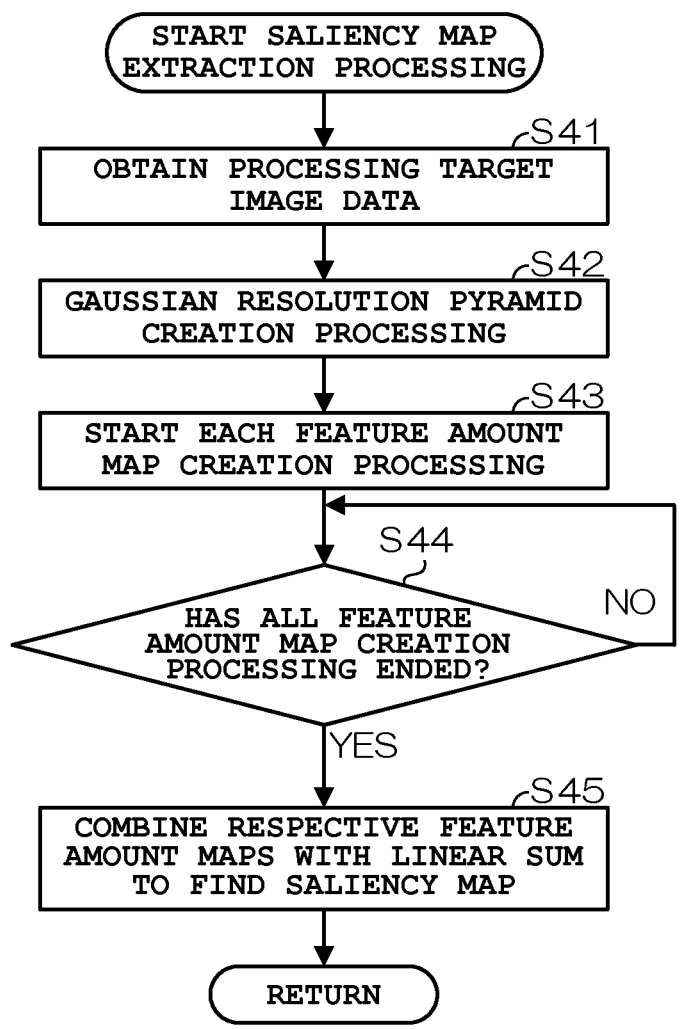
FIG. 10 is a flowchart of an example of saliency map extraction processing of the second embodiment.

FIG. 10 is a flowchart of a detailed example of a flow of attention point estimation processing when the Treisman's feature integration theory or a saliency map by Itti and Koch is applied.

At Step S41, the CPU 7 obtains frame image data obtained from through imaging as processing target image data.

At Step S42, the CPU 7 creates a Gaussian resolution pyramid. Specifically, for example, the CPU 7 repeatedly and sequentially performs Gaussian filtering processing and down sampling processing with processing target image data {(pixel data at a position of (x, y)} being taken as I(0)=I(x, y). As a result, a set of hierarchical scale image data I(L) (for example, L∈{0 . . . 8}) is generated. This set of hierarchical scale image data I(L) is called a Gaussian resolution pyramid. Here, when the scale L=k (here, k is any of integer values from 1 to 8) holds, the scale image data I(k) represents an image reduced by ½k (an original image when k=0).

At Step S43, the CPU 7 starts each feature amount map creation processing. A detailed example of each feature amount map creation processing will be described further below with reference to FIG. 11A to FIG. 11C and FIG. 12A to FIG. 12C.

At Step S44, the CPU 7 determines whether all feature amount map creation processing have ended. If even one of the feature amount map creation processing has not ended, NO is determined at Step S44, and the processing again returns to Step S44. That is, the determination processing at Step S44 is repeatedly performed until all feature amount map creation processing end. Then, if all feature amount map creation processing have ended to create all feature amount maps, YES is determined at Step S44, and the processing goes to Step S45.

At Step S45, the CPU 7 combines the respective feature amount maps together with a linear sum to find the saliency map S. When the saliency map S is found in this manner, the saliency map extraction processing ends. That is, the processing at Step S22 of FIG. 9 ends, and the processing goes to Step S23. In the example of FIG. 8, the processing at Step Sa ends, and the processing goes to Step Sb.

Next, a specific example of each feature amount map creation processing is described.

FIG. 11A to FIG. 11C are flowcharts of examples of feature amount map creation processing for luminance, color, and directivity.

FIG. 11A depicts an example of feature amount map creation processing for luminance.

At Step S61, the CPU 7 sets each attention pixel from each scale image corresponding to the processing target image data. The following description is made assuming that each attention pixel c∈{2, 3, 4} is set. Each attention pixel c∈{2, 3, 4} is a pixel set as a computation target on the scale image data I(c) of a scale c∈{2, 3, 4}.

At Step S62, the CPU 7 finds a luminance component of each scale image of each attention pixel cγ{2, 3, 4}.

At Step S63, the CPU 7 finds a luminance component of each scale image of a surrounding pixel s=c+δ of each attention pixel. The surrounding pixel s=c+δ of each attention pixel is a pixel present so as to surround an attention pixel (a corresponding point) on the scale image I(s) of a scale s=c+δ when, for example, δ∈{3, 4} is set.

At Step S64, the CPU 7 finds a luminance contrast at each attention pixel c∈{2, 3, 4} for each scale image. For example, the CPU 7 finds an interscale difference between each attention pixel c∈{2, 3, 4} and the surrounding pixel s=c+δ (for example, δ∈{3, 4}) of each attention pixel. Here, when it is assumed that the attention pixel c is referred to as Center and the surrounding pixel s of the attention pixel is referred to as Surround, the found interscale difference can be referred to as a Center-Surround interscale difference for luminance. This Center-Surround interscale difference for luminance has a property of having a large vale when the attention pixel c is white and the surrounding pixel s is black or vice versa. Therefore, the Center-Surround interscale difference for luminance represents a luminance contrast. This luminance contrast is hereinafter described as I(c, s).

At Step S65, the CPU 7 determines whether a pixel not set as an attention pixel is present in each scale image corresponding to the processing target image data. If such a pixel is present, YES is determined at Step S65, and the processing returns to Step S61 and the processing thereafter is repeated.

That is, for each pixel of each scale image corresponding to the processing target image data, the processing at Step S61 to Step S65 are performed to find the luminance contrast I(c, s) for each pixel. Here, when each attention pixel c∈{2, 3, 4} and each surrounding pixel s=c+δ (for example, δ∈{3, 4}) are set, with one series of processing at Step S61 to Step S65, (three attention pixels)×(two surrounding pixels)=six luminance contrasts I(c, s) are found. Here, a collection of the luminance contrasts I(c, s) found for the predetermined c and the predetermined s for all the images is referred to as a feature amount map for the luminance contrast I. As a result of repetition of the loop processing at Step S61 to Step S65, six feature amount maps for the luminance contrast I are found. When six feature amount maps for the luminance contrast I are found in this manner, NO is determined at Step S65, and the processing goes to Step S66.

At Step S66, the CPU 7 creates a feature amount map for luminance by normalizing each of the feature amount maps for the luminance contrast I and then combining the normalized feature amount maps. With this, the feature amount map creation processing for luminance ends. Hereinafter, the feature amount map for luminance is descried as FI for differentiation from other feature amount maps.

FIG. 11B depicts an example of feature amount map creation processing for color.

The feature amount map creation processing for color in FIG. 11B is basically similar in the processing flow to the feature amount map creation processing for luminance in FIG. 11A, and is different therefrom only in the processing target. That is, processing at Step S81 to Step S86 in FIG. 11B correspond to the processing at Step S61 to Step S66 in FIG. 11A, respectively, and the only difference from FIG. 11A is the processing target at each step. Therefore, regarding the feature amount map creation processing for color in FIG. 11B, description of the processing flow is omitted, and only the processing target is briefly described below.

That is, while the processing target at Step S62 and Step S63 of FIG. 11A is a luminance component, the processing target at Step S82 and Step S83 of FIG. 11B is a color component.

Also, in the processing at Step S64 of FIG. 11A, the Center-Surround interscale difference of luminance is found as the luminance contrast I(c, s). By contrast, in the processing at Step S84 of FIG. 11B, a Center-Surround interscale difference of each of color phases (R/G and B/Y) is found as a color phase contrast. Among color components, a red component is represented by R, a green component is represented by G, a blue component is represented by B, and a yellow component is represented by Y. Also, hereinafter, a color phase contrast for the color phase R/G is described as RG(c, s) and a color phase contrast for the color phase B/Y is described as BY(c, s).

Here, in conformity with the example described above, it is assumed that three attention pixels c are present and two surrounding pixels s are present. In this case, as a result of the loop processing at Step S61 to Step S65 of FIG. 11A, six feature amount maps for luminance contrast I are obtained. By contrast, as a result of the loop processing at Step S81 to Step S85 of FIG. 11B, six feature amount maps for color phase contrast RG and six feature amount maps for color phase contrast BY are obtained.

Eventually, a feature amount map FI for luminance is found in the processing at Step S66 of FIG. 11A.

By contrast, a feature amount map for color is found in the processing at Step S86 of FIG. 11B. Hereinafter, the feature amount map for color is described as FC for differentiation from other feature amount maps.

FIG. 11C depicts an example of feature amount map creation processing for directivity.

The feature amount map creation processing for directivity in FIG. 11C is basically similar in the processing flow to the feature amount map creation processing for luminance in FIG. 11A, and is different therefrom only in the processing target. That is, processing at Step S101 to Step S106 in FIG. 11C correspond to the processing at Step S61 to Step S66 in FIG. 11A, respectively, and the only difference from FIG. 11A is the processing target at each step. Therefore, regarding the feature amount map creation processing for directivity in FIG. 11C, description of the processing flow is omitted, and only the processing target is briefly described below.

That is, the processing target at Step S102 and Step S103 is a directivity component. Here, the directivity component is an amplitude component in each direction obtained as a result of convoluting a Gaussian filter $\phi$ with respect to a luminance component. The direction herein is a direction indicated by an angle of rotation $\theta$ present as a parameter of the Gaussian filter $\phi$. For example, as the angle of rotation $\theta$, four directions can be adopted, that is, 0°, 45°, 90°, and 135°.

Also, in processing at Step S104, A Center-Surround interscale difference for directivity is found as a directivity contrast. Hereinafter, the directivity contrast is described as $O(c, s, \theta)$.

Here, in conformity with the example described above, it is assumed that three attention pixels c are present and two surrounding pixels s are present. In this case, as a result of the loop processing at Step S101 to Step S105, six feature amount maps for directivity contrast O are obtained for each angle of rotation $\theta$. For example, when four directions of 0°, 45°, 90°, and 135° are adopted as the angle of rotation $\theta$, twenty-four (=6×4) feature amount maps for the directivity contrast O are found.

Eventually, a feature amount map for directivity is found in the processing at Step S106. Hereinafter, the feature amount map for directivity is described as FO for differentiation from other feature amount maps.

The feature amount map creation processing is not particularly restricted to the examples of FIG. 11A to FIG. 11C. For example, as the feature amount map creation processing, it is possible to adopt processing to create a feature amount map by using each of feature amounts of brightness, color saturation, color phase, and motion.

Also, as the feature amount map creation processing, it is possible to adopt processing to create a feature amount map by using each of feature amounts of multi-scale contrast, a Center-Surround color histogram, and color spatial distribution.

FIG. 12A to FIG. 12C are flowcharts of other examples of the feature amount map creation processing for multi-scale contrast, Center-Surround color histogram and color spatial distribution.

FIG. 12A depicts an example of feature amount map creation processing for multi-scale contrast.

At Step S121, the CPU 7 finds a feature amount map for multi-scale contrast. With this, the feature amount map creation processing for multi-scale contrast ends.

Hereinafter, the feature amount map for multi-scale contrast is described as Fc for differentiation from other feature amount maps.

FIG. 12B depicts an example of feature amount map creation processing for Center-Surround color histogram.

At Step S141, the CPU 7 finds a color histogram of a rectangular area and a color histogram of a surrounding contour for each different aspect ratio. The aspect ratio itself is not particularly restrictive and, for example, {0.5, 0.75, 1.0, 1.5, 2.0} can be adopted.

At Step S142, the CPU 7 finds a chi-square distance between the color histogram of the rectangular area and the color histogram of the surrounding contour for each different aspect ratio. At Step S143, the CPU 7 finds a color histogram of the rectangular area having a maximum chi-square distance.

At Step S144, the CPU 7 creates a feature amount map for Center-Surround color histogram by using the color histogram of the rectangular area having the maximum chi-square distance. With this, the feature amount map creation processing for Center-Surround color histogram ends.

Hereinafter, the feature amount map for Center-Surround color histogram is described as Fh for differentiation from other feature amount maps.

FIG. 12C depicts an example of feature amount map creation processing for color spatial distribution.

At Step S161, the CPU 7 calculates dispersion in a horizontal direction for color spatial distribution. At Step S162, the CPU 7 calculates dispersion in a vertical direction for color spatial distribution. Then, at Step S163, the CPU 7 finds a color spatial dispersion by using the dispersion in the horizontal direction and the dispersion in the vertical direction.

At Step S164, the CPU 7 finds a feature amount map for color spatial dispersion by using the color spatial dispersion. With this, the feature amount map creation processing for color spatial distribution ends.

Hereinafter, the feature amount map for color spatial distribution is described as Fs for differentiation from other feature amount maps.

Third Embodiment

In a third embodiment, it is determined whether the flower image imaged and retained already in the retaining section 13A of the communication terminal 10 or the retaining section 130A of the server 100 and a newly imaged flower image. That is, it is determined whether the same flower has been imaged twice. This is a useful embodiment when the user sows flower seeds by himself or herself or sets out plants for growing. Portions common to the first embodiment are provided with common reference characters and are not described herein.

Since flowers grow, there is a high possibility that the retained flower image and the imaged flow image are different in the degree of blooming, height, and others from a visual point of view. However, in the flower search system according to the present invention, these flower images can be identified as having the same name. In association with the identified flower name, guide information for growing the flower is stored in the database 110. That is, guide information such as how to apply water, how to care by season, how to apply fertilizer, and the amount of sunshine are displayed on the display section 12. Therefore, if the same flower is imaged regularly, an appropriate advice is provided in consideration of the season, weather, the growing state, and others.

Fourth Embodiment

As described above, a still image is captured as a captured flower image in the first embodiment. In a fourth embodiment, moving pictures or continuous imaging is used. In the present embodiment, with the moving image imaging function of the imaging section 11, flower images F are imaged as moving pictures (continuously imaged), thereby obtaining a plurality of flower image frames. As an algorithm for extracting a flower area from the plurality of flower image frames, the algorithm described in the second embodiment can be applied.

When a flower area is extracted from the imaged flower image, continuously imaging a plurality of images can increase extraction accuracy. Since the flower imaging angle at the time of imaging and the angle of the flower sample image stored in the database 110 as a comparison target do not necessarily match each other, the presence of flower images imaged at different angles may increase the probability of successful searching. However, the image processing time and the load on the CPU are increased accordingly. In the present embodiment, a still image is initially imaged, and if the name of a flower with a similarity equal to or more than a predetermined similarity cannot be extracted due to execution of the flower search program, or in other words, if the state becomes as depicted in FIG. 5B, a display such as "IMAGE AGAIN AS MOVING PICTURES" is displayed on the display section 12, or a guide with voice is produced from a loudspeaker not shown. Portions common to the embodiments described above are provided with common reference characters and are not described herein.

While the system is exemplarily described in the above embodiments in which a communication terminal is connected to a server via the Internet, the present invention can be achieved as a standalone image search system with all structures accommodated in one casing.

Also, while the system is exemplarily described in the above embodiments in which the communication terminal is connected to the server via the Internet with a portable phone circuit or a wireless LAN, the communication terminal may be connected via infrared communication or Bluetooth (registered trademark) if the communication terminal and the server are close to each other.

Furthermore, the system is exemplarily described in the above embodiments in which the communication terminal includes an imaging section and a flower image imaged by the imaging section is searched for, it is also possible to make a search by obtaining an already-imaged flower image via a memory card or the like.

Still further, the present invention can be achieved also as a flower image search system. In this system, main structures including a database are all placed in a server. The database has feature information for identifying an image of an imaged flower in association with flower sample images, flower names, leaf sample images, and images indicating attention points for narrowing down the flower names. A communication terminal includes an imaging section, a display section, and an operating section; sends an image of a flower imaged by the communication terminal to the server. The server performs all of the following processing: processing for extracting a plurality of flower sample images having a high similarity to the image of the imaged flower as candidate images by comparing feature information of the image of the imaged flower and feature information stored in the database; a processing for reading, from the database, a) the candidate images, which are the plurality of extracted flower sample images, b) the flower names corresponding to the candidate images, c) attention points for narrowing down the candidate images, d) respective leaf sample images corresponding to the candidate images, and e) images corresponding to the candidate images and indicating their respective attention points and transmitting the above items a) to e) to the communication terminal; and processing for, when one of the candidate images is selected in the communication terminal, receiving selection information and identifying a flower name corresponding to the sent flower image.

While the present invention has been described with reference to the preferred embodiments, it is intended that the invention be not limited by any of the details of the description therein but includes all the embodiments which fall within the scope of the appended claims.

What is claimed is:

1. An image search apparatus that identifies an image of an imaged object by searching a database which has feature information stored in association with object sample images, object names, and object another portion sample images, the image search apparatus comprising:

a CPU which is configured to:

extract a plurality of object sample images having a high similarity to the image of the imaged object as candidate images by comparing feature information of the image of the imaged object and the feature information stored in the database;

cause the image of the imaged object, the candidate images that are the plurality of extracted object sample images, and object names corresponding to the candidate images to be arranged and displayed on a display section; and change the plurality of candidate images displayed on the display section to corresponding object another portion sample images and cause the corresponding object another portion sample images to be displayed on the display section.

2. The image search apparatus according to claim 1, wherein the CPU is further configured to, when one of the candidate images displayed on the display section is selected, identify an object name corresponding to the selected candidate image as a name of the imaged object.

3. The image search apparatus according to claim 1, wherein the CPU is further configured to:

arrange the candidate images that are the plurality of extracted object sample images in a descending order of similarity, and arrange the corresponding object another portion sample images as candidate images at the same positions as positions of the arranged candidate images that are the plurality of extracted object sample images.

4. The image search apparatus according to claim 1, wherein the CPU is further configured to change the plurality of candidate images displayed on the display section to corresponding images indicating attention points and cause the changed images to be displayed on the display section.

5. The image search apparatus according to claim 1, wherein the CPU is further configured to narrow down the displayed candidate images based on attention points.

6. The image search apparatus according to claim 1, wherein the CPU is further configured to:

estimate an attention point area by using a saliency map based on the feature information of the image of the imaged object;

divide the image of the imaged object into an area of the object, which is a main subject, and a background area by using the estimated attention point area; and extract the main subject area obtained by the division from the image of the imaged object.

7. The image search apparatus according to claim 6, wherein the CPU is configured to divide the image of the imaged object into the main subject area and the background area based on a predetermined algorithm using an energy function defined from a predetermined area including the attention point area.

8. The image search apparatus according to claim 7, wherein the predetermined algorithm is a Graph Cuts method.

9. The image search apparatus according to claim 6, wherein the CPU is further configured to extract a contour line or an edge shape from the image of the imaged object, wherein based on the extracted contour line or based on a contour line specified by the edge shape, CPU is configured to divide the image of the imaged object into the main subject area and the background area by taking an inner area of the contour line overlapping the attention point area as the main subject area and taking an outer area of the contour line as the background area.

10. An image search system that identifies an image of an imaged object by searching a database which has feature information stored in association with object sample images, object names, and object another portion sample images, the image search system comprising:

a plurality of CPUs which are configured to operate as:

an extracting section which extracts a plurality of object sample images having a high similarity to the image of the imaged object as candidate images by comparing feature information of the image of the imaged object and the feature information stored in the database;

a first display control section which causes the image of the imaged object, the candidate images that are the plurality of extracted object sample images, and object names corresponding to the candidate images to be arranged and displayed on a display section; and a second display control section which changes the plurality of candidate images displayed on the display section to corresponding object another portion sample images and causes the corresponding object another portion sample images to be displayed on the display section;

a communication terminal; and a server connected to the communication terminal via a network, wherein the display section is comprised in the communication terminal, and the database is comprised in the server.

11. The image search system according to claim 10, wherein a first one of the plurality of CPUs is comprised in the communication terminal and is configured to operate as the first display control section and the second display control section, and wherein a second one of the plurality of CPUs is comprised in the server and is configured to operate as the extracting section.

12. The image search system according to claim 10, wherein one of the plurality of CPUs is comprised in the server and is configured to operate as the first display control section and the second display control section.

13. The image search system according to claim 10, further comprising a storage section which stores the image of the imaged object;

wherein said plurality of CPUs are further configured to operate as a determining section which determines whether a name of an imaged object imaged by an imaging section matches a name of the imaged object stored in the storage section.

14. The image search system according to claim 13, wherein the database further has stored object guide information in association with object names, and wherein said plurality of CPUs are further configured to operate as a guiding section which, when the determining section determines that the name of the imaged object imaged by the imaging section matches the name of the imaged object stored in the storage section, provides guide information corresponding to the name of the imaged object imaged by the imaging section.

15. The image search apparatus according to claim 6, further comprising:

a moving image imaging section which images a moving image, wherein the CPU is further configured to extract the main subject area from the moving image imaged by the moving image imaging section.

16. The image search apparatus according to claim 15, wherein the CPU is further configured to request start of the moving image imaging section when the CPU is unable to extract the plurality of object sample images having the high similarity to the image of the imaged object.

17. The image search apparatus according to claim 1, wherein the imaged object is a flower, and the database has the feature information stored in association with flower sample images, flower names, leaf sample images, and images indicating attention points for narrowing down the flower names.

18. A non-transitory computer-readable storage medium having stored thereon an image search program that is executable by a computer of an image search apparatus that identifies an image of an object imaged by an imaging section by searching a database having feature information stored in association with object sample images, object names, and object another portion sample images, the program being executable by the computer to perform functions comprising:
  extracting a plurality of object sample images having a high similarity to the image of the imaged object as candidate images by comparing feature information of the image of the imaged object and the feature information stored in the database;
  causing the image of the imaged object, the candidate images that are the plurality of extracted object sample images, and object names corresponding to the candidate images to be arranged and displayed on a display section; and
  changing the plurality of candidate images displayed on the display section to corresponding object another portion sample images and causing the corresponding object another portion sample images to be displayed on the display section.

19. A non-transitory computer-readable storage medium having stored thereon an image search program that is executable by a computer of a communication terminal including an imaging section and a display section, the program being executable by the computer to perform functions comprising:
  imaging an image of an object;
  transmitting the image of the imaged object to a server via a network;
  receiving candidate images that are a plurality of object sample images having a high similarity to the image of the imaged object, object names corresponding to the candidate images, and object another portion sample images corresponding to the candidate images, which are sent from the server;
  causing the image of the imaged object, the received candidate images that are the plurality of object sample images, and the received object names corresponding to the candidate images to be arranged and displayed on the display section; and
  changing the plurality of candidate images displayed on the display section to the object another portion sample images corresponding to the candidate images and causing the corresponding object another portion sample images to be displayed on the display section.

20. A non-transitory computer-readable storage medium having stored thereon an image search program that is executable by a computer of a server that identifies an image of an object sent from an external communication terminal via a network by searching a database which has feature information stored in association with object sample images, object names, and object another portion sample images, the program being executable by the computer to perform functions comprising:
  extracting a plurality of object sample images having a high similarity to the image of the imaged object as candidate images by comparing feature information of the image of the imaged object sent from the communication terminal and the feature information stored in the database;
  reading, from the database, the candidate images that are the plurality of extracted object sample images, object names corresponding to the candidate images, and respective object another portion sample images corresponding to the candidate images;
  transmitting the read candidate images, the object names corresponding to the candidate images, and the respective object another portion sample images corresponding to the candidate images to the communication terminal;
  changing a display at the communication terminal from the candidate images that are the plurality of extracted object sample images to the respective object another portion sample images corresponding to the candidate images such that the respective object another portion sample images are displayed at corresponding positions of the candidate images that are the plurality of extracted object sample images.

21. An image search method for identifying an image of an object imaged by an imaging section by searching a database having feature information stored in association with object sample images, object names, and object another portion sample images, the image search method comprising:
  extracting a plurality of object sample images having a high similarity to the image of the imaged object as candidate images by comparing feature information of the image of the imaged object and the feature information stored in the database;
  causing the image of the imaged object, the candidate images that are the plurality of extracted object sample images, and object names corresponding to the candidate images to be arranged and displayed on a display section; and
  changing the plurality of candidate images displayed on the display section to corresponding object another portion sample images and causing the corresponding object another portion sample images to be displayed on the display section.

* * * * *